Dec. 9, 1952      F. A. MÖLLER      2,621,126
PROCESS OF MANUFACTURING FOODSTUFFS FROM CEREALS
Filed March 28, 1946
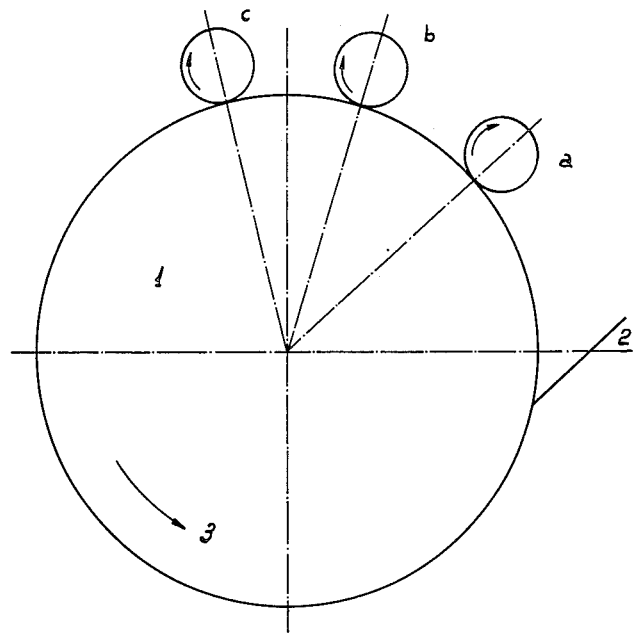
INVENTOR.
F. A. Moller
BY Wenderoth, Lind & Ponack
Attorneys Patented Dec. 9, 1952

2,621,126

UNITED STATES PATENT OFFICE 2,621,126

PROCESS OF MANUFACTURING FOODSTUFFS FROM CEREALS

Fredrik André Möller, Haren, Netherlands, assignor to Naamlooze Vennootschap: W. A. Scholten's Chemische Fabrieken, Groningen, Netherlands, a corporation of the Netherlands Application March 28, 1946, Serial No. 657,899
In the Netherlands November 3, 1944

Section 1, Public Law 690, August 8, 1946
Patent expires November 3, 1964

4 Claims. (Cl. 99—80)

With a view to their high nutrient value cereals are not only used for breadmaking but also as a starting material for various other foodstuffs. It has been proposed to manufacture foodstuffs from various cereals by pressing the cereals between heated or nonheated cylinders without previously comminuting the grains. The flakes obtained in this way have to be boiled with milk or another aqueous liquid in order to produce a foodstuff in a form ready to eat. The necessity of carrying out a boiling process for preparing a porridge, however, is considered as a drawback and it has therefore been tried to facilitate this boiling process. This is possible by subjecting the cereal grains as such or in ground condition to a steaming or cooking process, preferably under pressure. As a matter of fact a considerable improvement is reached in this way and the products obtained are the so called fast boiling flakes.

Up to the present, however, it has not been possible to produce, directly from the above mentioned starting materials, a foodstuff, which does not require a boiling process for making a palatable dish. The invention has for its object the manufacture of such a foodstuff, either in the form of flakes or in the form of small grains which, when stirred with cold or warm milk or other liquids, e. g. soup or meat extract, immediately gives a porridge or other dish ready to eat.

The process according to the invention consists therein that the cereal grains are comminuted to such a degree that the particles are not yet completely of powder size and mixed with not more than 100% of water, that this mixture is heated for a short time to a high temperature, while being pressed by mechanical pressure to a cohesive layer and simultaneously or immediately thereafter dried, and that the dry material obtained in this way is comminuted.

As starting materials for the present process all kinds of cereals, e. g. wheat, rye, oats, barley or rice, can be used. The material is broken or ground to such a degree that the comminuted material is not yet completely in powder form. By the subsequent treatment, consisting in mixing the material with less than its own weight of water, a paste must be produced which is not too thick. If the material would be ground to a high degree of fineness it would produce when mixed with this relatively small amount of water a pastelike mass of high viscosity, just as when a pure flour of the cereal in question would be used, and a paste of this character would be less suitable for the present purpose.

Moreover the process according to the invention provides a product which is of a superior quality as compared with the product obtained when the starting material is completely ground to a fine powder. It has a more attractive appearance and the consistency of a porridge prepared from the same is better.

As a rule, e. g. when treating wheat according to the invention the grains are ground in unpeeled condition. Care must be taken, however, that the skins are comminuted to a sufficient degree of fineness, in contradistinction to what is desired in the ordinary milling process where it is desirable to grind the flour as fine as possible but to keep the skin particles in coarse condition.

The water to be added to the comminuted grains must be of such a temperature that the starch granules present in the same are not yet substantially gelatinized. Preferably the material is mixed with cold water.

The mixture obtained in this way is now subjected to the heating and drying process described above. This is possible by supplying the mixture on a rotating cylinder, which is heated with steam and provided with pressing rolls, after the method known for the manufacture of cold swelling starch. The material thereby acquires a temperature which is considerably above the gelatinizing point of the starch contained in the same. The starch is gelatinized, a cohesive, viscous and consistent mass being produced which by the mechanical pressure of the rolls is pressed out relatively to a thin layer. Immediately thereafter the layer is completely dried by the heat of the cylinder.

It is important that the mixture contains only a limited proportion of water, viz. not more than 100%, calculated on the weight of the starting material.

In this case the swollen particles will completely fill up the available space whereby the destruction and complete homogenizing of the starch granules will be promoted by the pressure which is simultaneously exerted.

It is advantageous to use a device, containing two or more pressing rolls so that a plurality of layers of the mixture is successively applied upon the cylinder. The fleece obtained is thereby made thicker and more cohesive and the particles of the final product will have the desired limited swelling power. In general at least two rolls must be used in order to obtain a product of the desired properties, especially a product having a sufficient volume weight.

After drying the fleece is removed from the cylinder in the usual way by cutting or scraping and subsequently comminuted, whereby a product in the form of flakes or small grains is obtained.

A device suitable for the process according to the invention is illustrated in the drawing.

This device consists of a rotating cylinder 1, three pressing rolls a, b, c and a scraper 2. The directions in which the cylinder and the pressing rolls revolve are indicated by arrows. The mixture to be treated is applied on the cylinder between the pressing roll a and the scraper 2 and between the pressing rolls so that each pressing roll forms a thin layer on the surface of the cylinder. The film obtained in this way is dried and removed by the scraper 2.

The said flakes of grains (the manufacturing method of which, as shown above, is substantially different from that of the well known cereal flakes in which the swollen grains are pressed between cylinders without previously comminuting the same) contain all constituents of the starting product in fully cooked condition. The product therefore has the property of producing a consistent porridge when stirred with cold or warm milk, whereas from the usual cereal flakes a porridge can only be obtained by heating or boiling the same for some time with the liquid. Owing to this fully cooked condition the digestibility of the foodstuff according to the invention is excellent and surpasses that of other foodstuffs containing large amounts of starch.

As a consequence of the intensive heat treatment with simultaneous pressing to which the product has been subjected it has very good keeping qualities.

The nutrient value of the foodstuffs can be increased and the taste improved by incorporating other foodstuffs, salts, sugars, flavouring substances, vitamins and the like. They may e. g. be added to the water, used for making the suspension of the ground cereal or mixed with the comminuted product.

Foodstuffs with characteristic properties may be obtained by subjecting the dried material to a roasting process, preferably by heating the material to a temperature of 120–180° C. and simultaneously stirring the same. The product thereby acquires an agreeable taste and a very attractive yellow or brown colour. The roasting process gives particularly good results when the material is previously admixed with a sugar e. g. glucose, saccharose, maltose or lactose.

According to an embodiment of the invention valuable foodstuffs are produced by adding dry milk constituents to the products obtained by any of the processes described above. In order to prepare a porridge from the product obtained in this way it is unnecessary to add milk and it is sufficient to stir the same with cold or warm water. A foodstuff of this composition contains all constituents of the porridge in dry form. This is of substantial value in countries where or in periods in which sufficient quantities of fresh milk are not available.

Moreover the preparation of the porridge is considerably simplified and takes much less time, which is important e. g. for persons who suffer from stomach diseases, for camping purposes, for workmen in canteens and for those who have to prepare their own meals.

The dry milk constituents e. g. are preferably added in the form of milk powder or skim milkpowder; the best results are obtained with the so called spray powders which are easily soluble.

Dry products which when stirred with cold or warm water produce a satisfactory porridge, however, may also be obtained by the addition of whey powder.

The proportion of dry milk constituents to be added may be varied within wide limits. The dry product may e. g. be mixed with an equal weight of milk powder or skim milk powder; in order to make a porridge e. g. 5 parts by weight of water or 1 part by weight of the mixture may be added. We may, however, also use a smaller proportion of milk powder; this depends from the question whether a porridge with a high proportion of milk constituents is desired or whether it is sufficient to have a porridge with a lower proportion of milk constituents than could be obtained by stirring the comminuted flakes with milk or skimmed milk.

If desired milk constituents e. g. milk powder may also be incorporated into the material prior to the heating process. In this care the effect of the milk constituents, however, is essentially different from that of the milk constituents added after the heating process.

In the first case the milk powder is dried in the foodstuff, so that it forms a constituent of the same, which, when the product is stirred with water, does not dissolve separately. The swelling properties of the final product are substantially weakened in this case.

*Example*

100 kilograms of wheat which have been previously treated in a peeling machine are ground in a disintegrator and mixed with 1% of common salt and 90% of water, calculated on the weight of the starting material. The mixture is supplied on a rotating cylinder which is heated with steam and provided with three pressing rolls. The dried material is removed from the surface of the cylinder by means of a scraping device and comminuted to a mass consisting of small flakes or particles.

I claim:

1. A process of manufacturing foodstuffs in cooked condition comprising comminuting wheat grains to a particle size between 20 mesh and 100 mesh, mixing the comminuted grains with a proportion of water sufficient to form a raw paste and not in excess of 100% relative to said grains, at a temperature insufficient to gelatinize the starch in said grains, heating and drying said paste in the form of a thin compressed film at a temperature of about 100° C. to about 180° C. whereby said starch is completely gelatinized, and comminuting the dry material obtained in this way.

2. A process of manufacturing foodstuffs in cooked condition comprising comminuting wheat grains to a particle size between 20 mesh and 100 mesh, mixing the comminuted grains with a proportion of water sufficient to form a raw paste and not in excess of 100% relative to said grains, at a temperature insufficient to gelatinize the starch in said grains, heating and drying said paste in the form of a thin compressed film at a temperature of about 100° C. to about 180° C. whereby said starch is completely gelatinized, comminuting the dry material obtained in this way, and subjecting the same to a roasting process.

3. A process of manufacturing foodstuffs in cooked condition comprising comminuting wheat grains to a particle size between 20 mesh and 100 mesh, mixing the comminuted grains with a proportion of water sufficient to form a raw paste and not in excess of 100% relative to said grains, at a temperature insufficient to gelatinize the starch in said grains, heating and drying said paste in the form of a thin compressed film at a temperature of about 100° C. to about 180° C. whereby said starch is completely gelatinized, comminuting the dry material obtained in this way, and subjecting the same to a roasting process by heating the material to a temperature above 120° C. for at least 20 minutes.

4. A process of manufacturing foodstuffs in cooked condition comprising comminuting wheat grains to a particle size between 20 mesh and 100 mesh, mixing the comminuted grains with a proportion of water sufficient to form a raw paste and not in excess of 100% relative to said grains at a temperature insufficient to gelatinize the starch in said grains, heating and drying said paste in the form of a thin compressed film at a temperature of about 100° C. to about 180° C. whereby said starch is completely gelatinized, and comminuting the dry material obtained in this way, said thin compressed film consisting of at least two superimposed layers.

FREDRIK ANDRÉ MÖLLER.

REFERENCES CITED

The following references are of record in the file of this patent:

UNITED STATES PATENTS

| Number | Name | Date |
|---|---|---|
| 372,065 | Gent | Oct. 25, 1887 |
| 440,866 | Lanhoff | Nov. 18, 1890 |
| 878,189 | Caverhill | Feb. 4, 1908 |
| 1,127,778 | Kitchener | Feb. 9, 1915 |
| 1,939,973 | Giesecke | Dec. 19, 1933 |
| 1,990,329 | Johnson | Feb. 5, 1935 |
| 2,064,701 | Stokhebye | Dec. 15, 1936 |
| 2,071,434 | Sarnmark | Feb. 23, 1937 |
| 2,098,293 | Jefferies | Nov. 9, 1937 |

FOREIGN PATENTS

| Number | Country | Date |
|---|---|---|
| 435,002 | Great Britain | Sept. 12, 1935 |